(12) United States Patent
Studer et al.

(10) Patent No.: US 8,324,777 B2
(45) Date of Patent: Dec. 4, 2012

(54) METHOD AND SYSTEM FOR TRANSPORTATION USING A MAGNETIC BEARING STRUCTURE

(75) Inventors: Philip Albert Studer, Silver Spring, MD (US); Sandor Wayne Shapery, San Diego, CA (US)

(73) Assignee: Sandor Wayne Shapery, San Diego, CA (US)

( * ) Notice: Subject to any disclaimer, the term of this patent is extended or adjusted under 35 U.S.C. 154(b) by 244 days.

(21) Appl. No.: 12/732,098

(22) Filed: Mar. 25, 2010

(65) Prior Publication Data

US 2010/0301979 A1    Dec. 2, 2010

Related U.S. Application Data

(60) Provisional application No. 61/163,778, filed on Mar. 26, 2009.

(51) Int. Cl.
*H02K 7/09* (2006.01)
*B61B 13/08* (2006.01)

(52) U.S. Cl. ............ 310/90.5; 104/183; 310/12.09; 310/12.31

(58) Field of Classification Search ............. 310/90.5, 310/12.31, 12.09; 104/281, 283
See application file for complete search history.

(56) References Cited

U.S. PATENT DOCUMENTS

| | | | |
|---|---|---|---|
| 3,569,804 A | 3/1971 | Studer | |
| 3,594,622 A | 7/1971 | Inagaki | |
| 3,694,041 A | 9/1972 | Studer | |
| 3,706,922 A | 12/1972 | Inagaki | |
| 3,780,668 A | 12/1973 | Schwarzler et al. | |
| 3,797,402 A | 3/1974 | Karch | |
| 3,797,403 A | 3/1974 | Schwarzler et al. | |
| 3,845,720 A | 11/1974 | Bohn et al. | |
| 3,911,828 A | 10/1975 | Schwarzler | |

(Continued)

FOREIGN PATENT DOCUMENTS

DE    21 63 217 A1    6/1973

(Continued)

OTHER PUBLICATIONS

The International Search Report and the Written Opinion of the International Searching Authority mailed on Oct. 21, 2010 for corresponding PCT/US2010/028746.

*Primary Examiner* — Burton Mullins
(74) *Attorney, Agent, or Firm* — Knobbe Martens Olson & Bear LLP

(57) ABSTRACT

A method and system for transportation using a magnetic bearing structure is disclosed. In one aspect, an apparatus for carrying a load comprises a source of magnetic flux and a controller configured to control the position of the source of magnetic flux relative to a magnetizable structure. The source of magnetic flux comprises a first upper portion and a first lower portion of opposite polarities. The first portions are spaced apart horizontally from a first side of the magnetizable structure. The source of magnetic flux further comprises a second upper portion and a second lower portion of opposite polarities. The second portions are spaced apart horizontally from a second side of the magnetizable structure. The second side is opposite the first side. The first and second upper portions are magnetically attracted to an upper portion of the magnetizable structure and the first and second lower portions are magnetically attracted to a lower portion of the magnetizable structure.

21 Claims, 9 Drawing Sheets

U.S. PATENT DOCUMENTS

| | | | |
|---|---|---|---|
| 3,924,537 A | 12/1975 | Matsui et al. | |
| 3,976,339 A * | 8/1976 | Sabnis | 310/90.5 |
| 4,315,197 A | 2/1982 | Studer | |
| 4,324,185 A | 4/1982 | Vinson | |
| 4,634,191 A * | 1/1987 | Studer | 310/90.5 |
| 5,009,865 A | 4/1991 | Boden et al. | |
| 5,360,470 A | 11/1994 | Ono et al. | |
| 5,372,636 A | 12/1994 | Gray et al. | |
| 5,379,864 A | 1/1995 | Colby | |
| 5,757,098 A | 5/1998 | Higuchi et al. | |
| 5,923,109 A | 7/1999 | Higuchi et al. | |
| 5,959,382 A | 9/1999 | Dauwalter | |
| 5,982,065 A * | 11/1999 | Jamain et al. | 310/90.5 |
| 6,049,148 A * | 4/2000 | Nichols et al. | 310/68 B |
| 6,101,952 A | 8/2000 | Thornton et al. | |
| 6,259,179 B1 * | 7/2001 | Fukuyama et al. | 310/90.5 |
| 6,268,673 B1 | 7/2001 | Shah et al. | |
| 6,396,178 B1 | 5/2002 | Chiu | |
| 6,700,258 B2 * | 3/2004 | McMullen et al. | 310/90.5 |
| 6,977,451 B2 | 12/2005 | Onishi | |
| 7,126,244 B2 * | 10/2006 | Rozmus | 310/90.5 |
| 7,617,779 B2 | 11/2009 | Studer | |
| 2006/0113848 A1 | 6/2006 | Studer | |
| 2006/0243158 A1 | 11/2006 | Li | |
| 2008/0223249 A1 | 9/2008 | Studer | |
| 2009/0032350 A1 | 2/2009 | Shapery | |

FOREIGN PATENT DOCUMENTS

| | | | |
|---|---|---|---|
| JP | 58 144503 A | | 8/1983 |
| JP | 2001-349371 | * | 12/2001 |
| WO | 87-05271 | * | 9/1987 |
| WO | WO 01/96139 A2 | | 12/2001 |

* cited by examiner

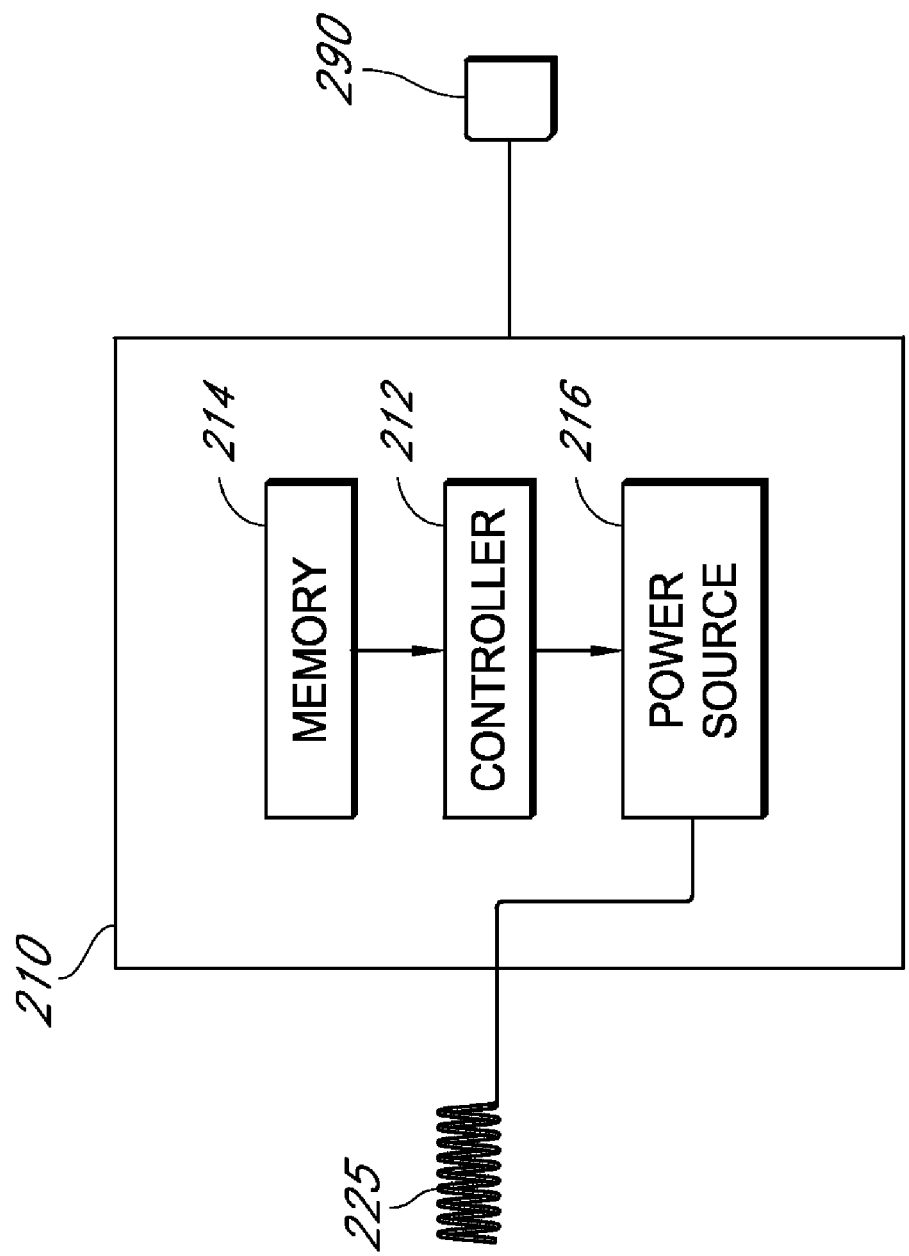

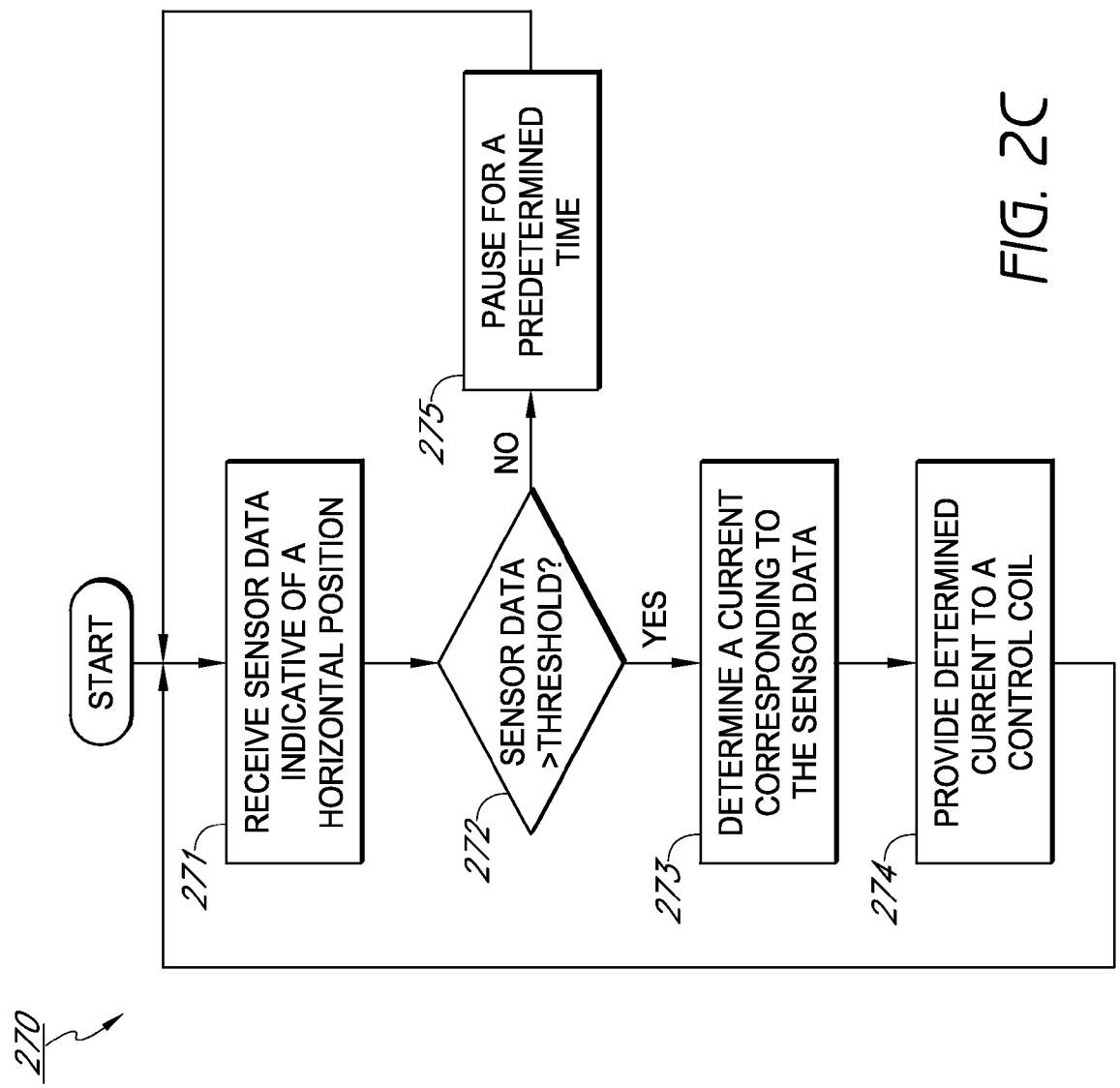

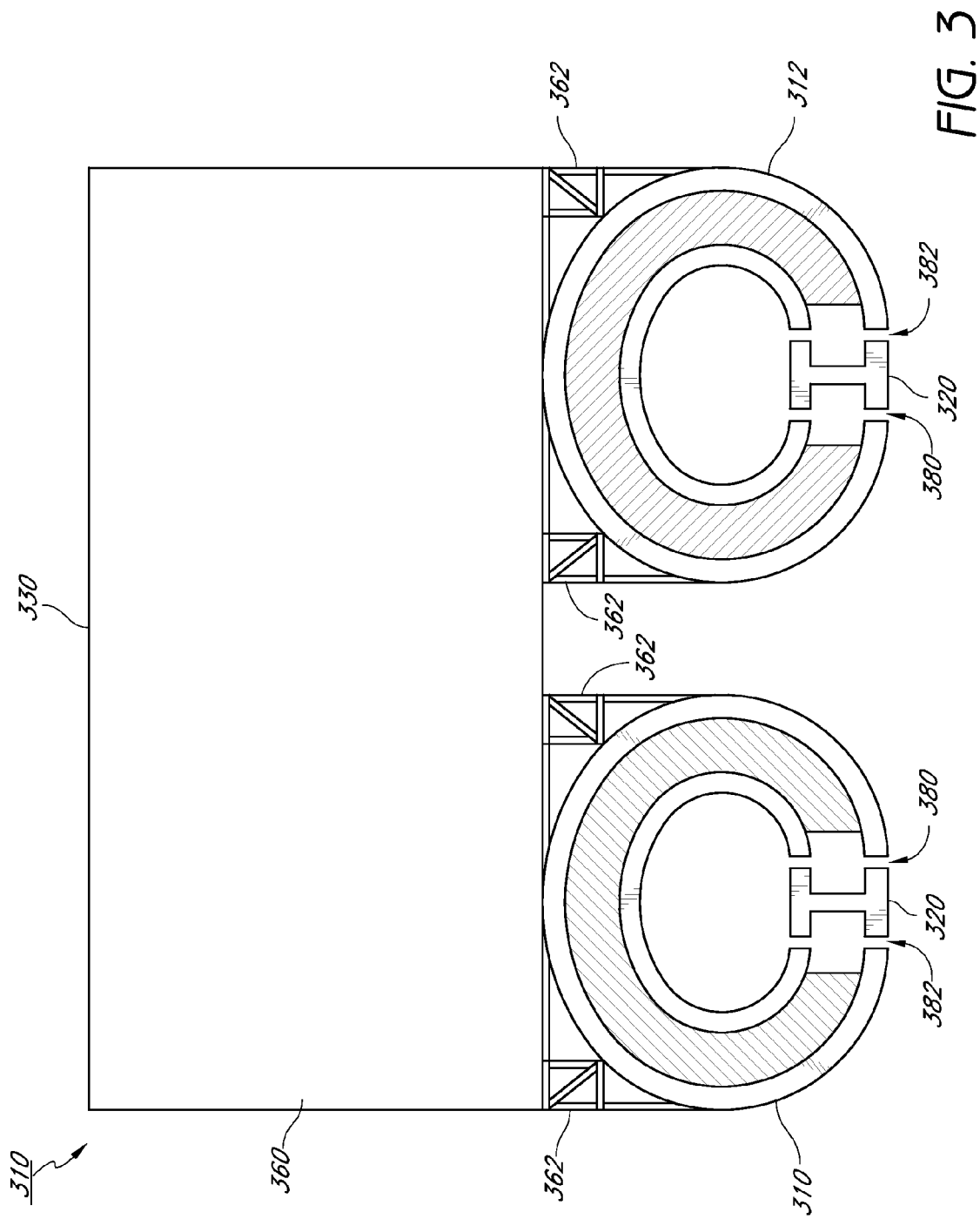

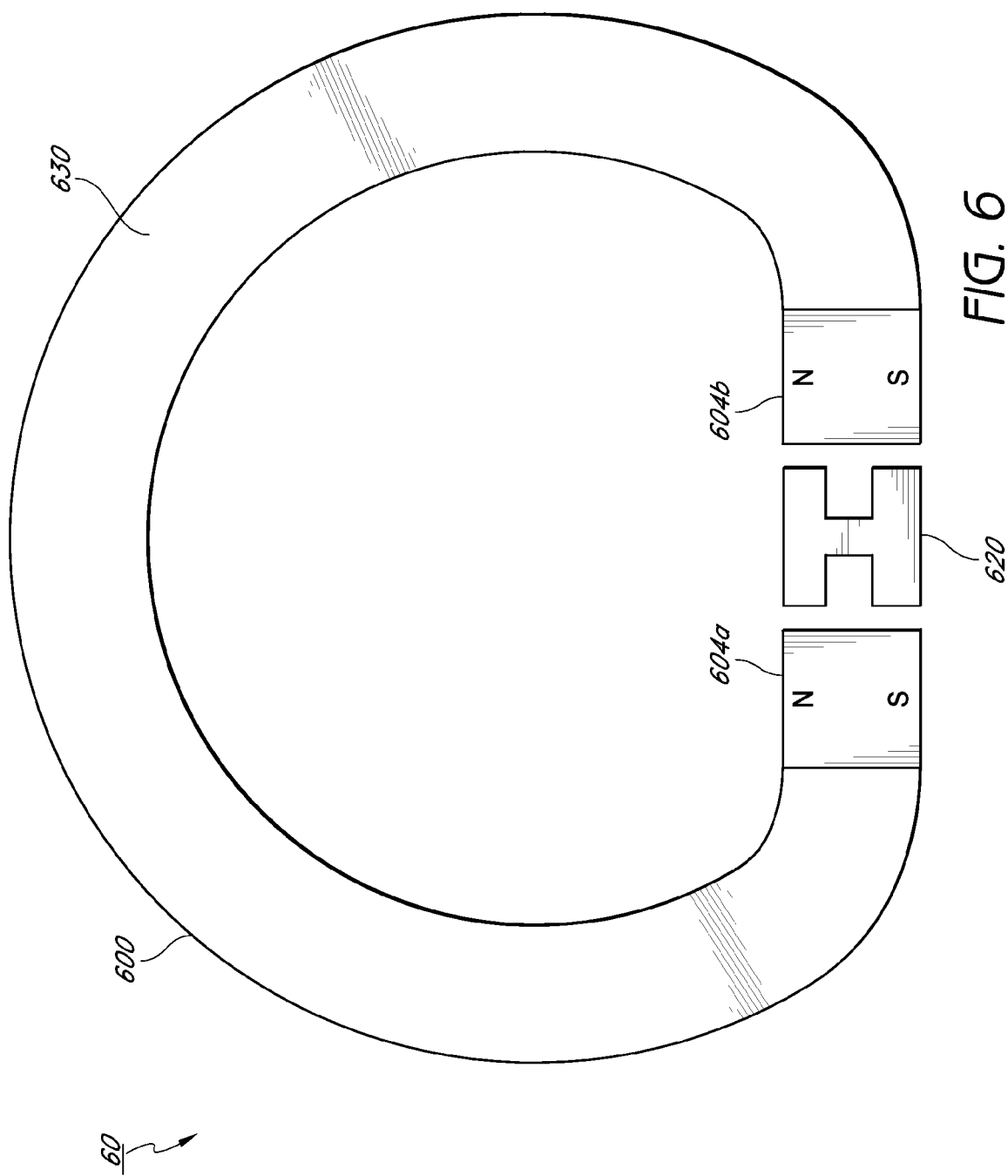

METHOD AND SYSTEM FOR TRANSPORTATION USING A MAGNETIC BEARING STRUCTURE

CROSS-REFERENCE TO RELATED APPLICATIONS

This application claims priority under 35 U.S.C. §119(e) of provisional application 61/163,778 filed Mar. 26, 2009, which is hereby incorporated by reference. This application also relates to U.S. Pat. Nos. 7,617,779; 3,569,804; and 6,977,451 each of which is hereby incorporated by reference in its entirety.

BACKGROUND

Field

The invention generally relates to a method and system for transportation using a magnetic bearing structure. More particularly, the invention generally applies to levitation of a load for transportation.

SUMMARY

In one aspect, an apparatus for carrying a load comprises a source of magnetic flux and a controller configured to control the position of the source of magnetic flux relative to a magnetizable structure. The source of magnetic flux comprises a first upper portion and a first lower portion of opposite polarities. The first portions are spaced apart horizontally from a first side of the magnetizable structure. The source of magnetic flux further comprises a second upper portion and a second lower portion of opposite polarities. The second portions are spaced apart horizontally from a second side of the magnetizable structure. The second side is opposite the first side. The first and second upper portions are magnetically attracted to an upper portion of the magnetizable structure and the first and second lower portions are magnetically attracted to a lower portion of the magnetizable structure.

BRIEF DESCRIPTION OF THE DRAWINGS

FIG. 2B is a functional block diagram of a horizontal positioning system.

FIG. 2C is a flowchart illustrating a method of providing a current to a control coil based on received sensor data.

FIG. 3 is a cross-sectional view of a system comprising a vehicle with magnetic bearing structures positioned proximally to rails.

FIG. 6 is a cross-sectional view of a system comprising a magnetic bearing structure with two magnets.

DETAILED DESCRIPTION

Figure 1A:
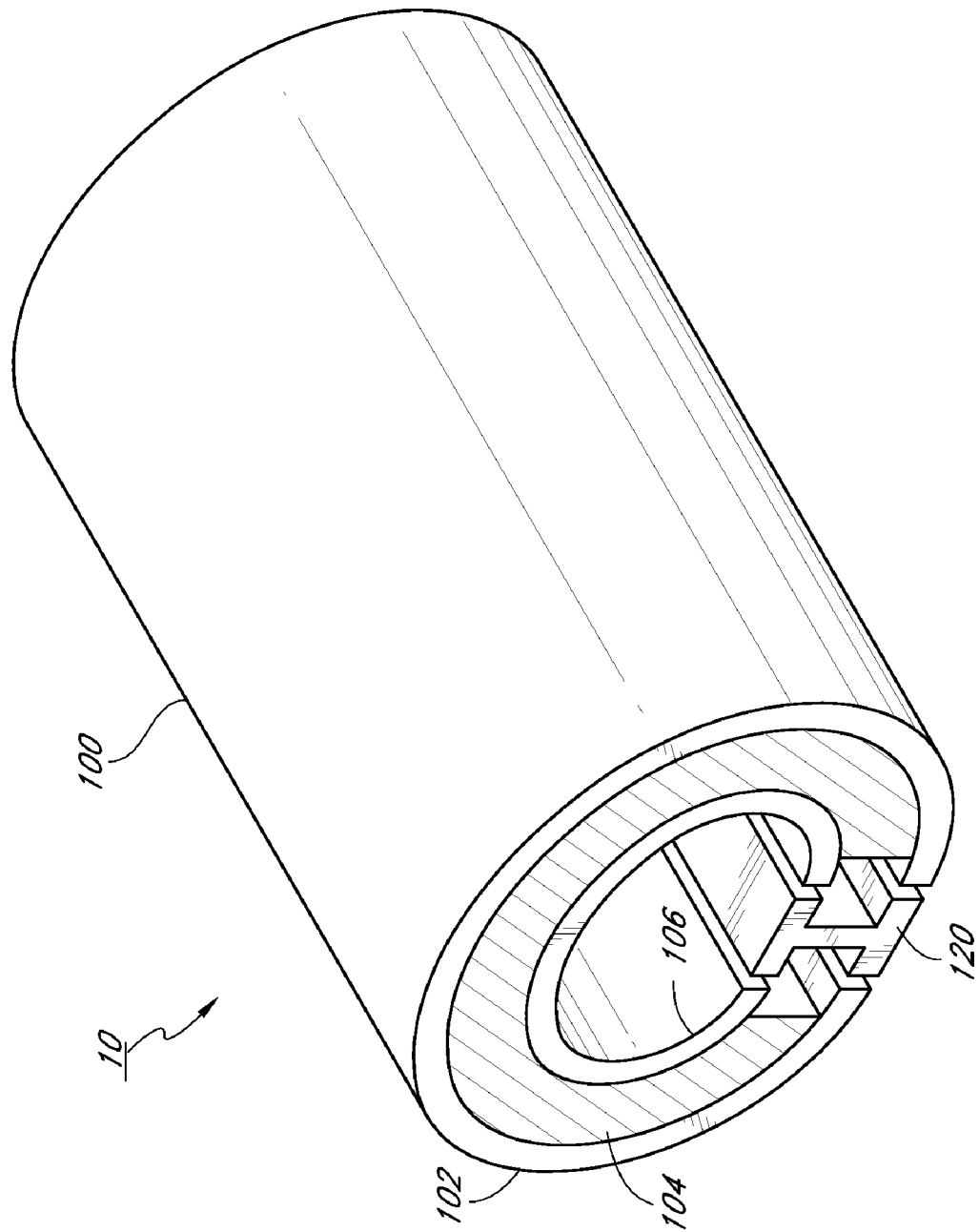
FIG. 1A is a perspective view of a system comprising a tubular magnetic bearing structure positioned proximally to a rail.

The following detailed description is directed to certain specific aspects of the invention. However, the invention may be embodied in a multitude of different ways, for example, as defined and covered by the claims. It should be apparent that the aspects herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Similarly, methods disclosed herein may be performed by one or more computer processors configured to execute instructions retrieved from a computer-readable storage medium. A computer-readable storage medium stores information, such as data or instructions, for some interval of time, such that the information may be read by a computer during that interval of time. Examples of computer-readable storage media are memory, such as random access memory (RAM), and storage, such as hard drives, optical discs, flash memory, floppy disks, magnetic tape, paper tape, and punch cards.

FIG. 1 is a perspective view of a system 10 comprising a tubular magnetic bearing structure 100 positioned proximally to a rail 120. The magnetic bearing structure 100 comprises a source of magnetic flux 104 between an inner shell 106 and an outer shell 102. In one embodiment, the outer shell 102 has a C-shaped cross-section and is positioned concentrically about the inner shell 106, which has a similarly C-shaped cross-section. Both the inner shell 106 and outer shell 102 are preferably made from a magnetizable material, such as iron or steel. The shells 102, 106 may guide the magnetic flux of the source of magnetic flux 104 along the inner and outer perimeter of the magnetic bearing structure 100 and thereby assist in containing and concentrating the magnetic flux of the source of magnetic flux 104.

Because of the magnetic attraction between the magnetic bearing structure 100 and the rail 120, the magnetic bearing structure 100 may support a load without contacting the rail 120. As described further with respect to FIG. 3, such a magnetic bearing structure 100 may be used to provide a levitative force countering the force of gravity upon a vehicle thereby reducing friction as the vehicle moves along the rail.

In one embodiment, the source of magnetic flux 104 comprises a single permanent magnet. Permanent magnets may comprise rare earth magnets, samarium-cobalt magnets, alnico magnets and neodymium magnets. The use of permanent magnets allows the bearing 100 to provide "always on" levitation forces which do not require an electric power source. In other embodiments, the source of magnetic flux 104 may comprise one or more permanent magnets and/or one or more electromagnets. In one embodiment, the source of magnetic flux 104 is uniformly radially magnetized, such that edge surfaces of the source of magnetic flux 104 contacting the outer shell 102 are of one polarity and edge surfaces of the source of magnetic flux 104 contacting the inner shell 106 are of an opposite polarity. The source of magnetic flux 104 may be a bonded magnet. In one embodiment, a bonded magnet comprises a magnetic powder blended together with a thermoplastic resin to form injection molded, compression, or flexible magnets. The magnetic powder may be aligned in a preferred direction while the resin is liquid and be maintained in this preferred direction by the resin when it is hardened. A bonded magnet may be used to minimize stray flux, e.g., flux projecting outside the desired boundaries of the magnetic bearing 10.

Figure 1B:
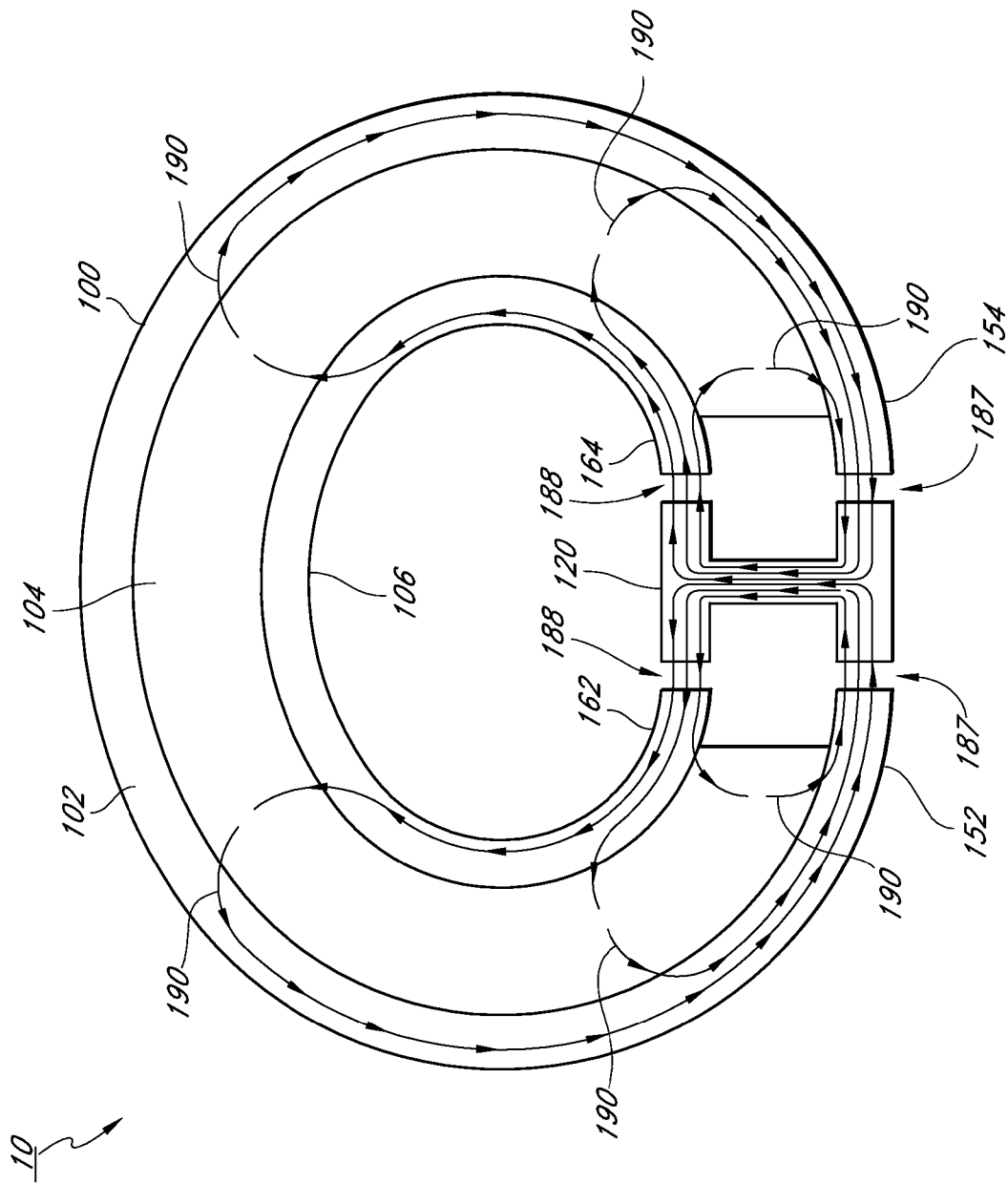
FIG. 1B is a cross-sectional view of the system of FIG. 1A illustrating a plurality of magnetic field lines representing a magnetic field.

FIG. 1B is a cross-sectional view of the system of FIG. 1A illustrating a plurality of magnetic field lines 190. Although only six field lines 190 are illustrated, it is to be appreciated that the magnetic field is a continuous field and more or fewer field lines 190 could be used to represent it. The outer shell 102 comprises a first end 152 and a second end 154 located proximally to protrusions of the rail 120. The inner shell 106 also comprises a first end 162 and a second end 164 similarly located proximally to protrusions of the rail 120. In one embodiment, the source of magnetic flux 104 generates a magnetic field represented by a plurality of magnetic field lines 190 beginning and ending at the source of magnetic flux 104. The outer shell 102 guides each field line 190 along the outer shell 102 to the first end 152 or second end 154 where it crosses the gap between the outer shell 102 and the rail 120. Each field line 190 continues via the rail 120 and exits the rail 120 by crossing the gap between the rail 120 and the first end 162 or second end 164 of the inner shell 106. The inner shell 106 guides each field line 190 along the inner shell 106 and each field line 190 ends back at the source of magnetic flux 104. Depending on the polarity of the source of magnetic flux 104, this order may be reversed.

In one embodiment, the length of the bearing 100 in the axial direction (along the rail 120) is larger than the radial thickness of the shell. This configuration minimizes non-suspensive flux and reduces stray fields as the lowest reluctance paths between the outer shell 102 and inner shell 106 are through the rail 120 via the gaps between the bearing 100 and the rail 120.

The rail 120 illustrated in FIG. 1 positioned between the first and second ends of the inner and outer shell has an I-shaped cross-section. In other embodiments, other shapes may be used. In one embodiment, the rail 120 is narrow enough to fit between the gaps between the first ends 152, 154 and second ends 162, 164. In one embodiment, the rail 120 is narrow enough to fit between the gaps between the first ends 152, 154 and second ends 162, 164 without contacting the magnetic bearing 100. The rail 120 may be of any axial length to allow propulsion in addition to levitation.

In one embodiment, the rail 120 comprises magnetizable material such as steel or iron. In another embodiment, the rail 120 comprises a magnetic material. The bearing 100 may "capture and restrain" the rail 120 since any vertical movement of the magnetic bearing structure 100 is resisted by magnetic forces generated by the source of magnetic flux 104 which tend to minimize the length of the magnetic field lines 190.

In one embodiment, the rail 120 comprises at least two substantially parallel rails separated by a gauge, each rail having a generally I-shaped profile with a head and a foot separated by a web. In one embodiment, the rail 120 comprises standard or international gauge rails, e.g., the gauge is approximately 1,435 mm. The gauge may be smaller or larger than 1,435 mm. In one embodiment, the rail 120 allow flanged wheels to ride along the head of the rail. Accordingly, embodiments described herein may be compatible with existing rail technology and other rolling stock.

Figure 2A:
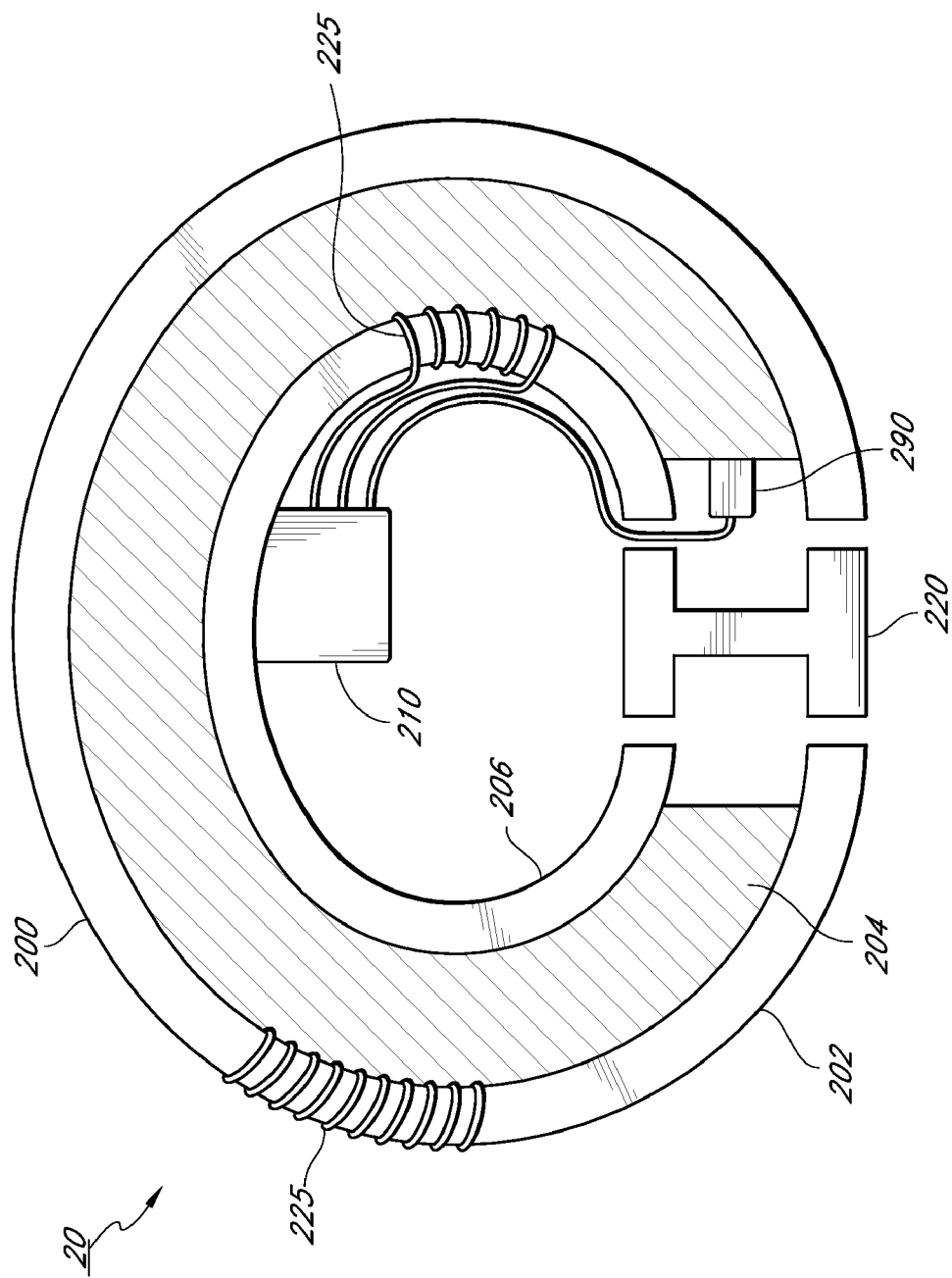
FIG. 2A is a front view of a system comprising a tubular magnetic bearing structure having a control coil.

FIG. 2A is a front view of a system comprising a tubular magnetic bearing structure 200 having a control coil 225. The magnetic bearing structure 200 comprises a source of magnetic flux 204 between an inner shell 206 and an outer shell 202. As described above with respect to the system 10 of FIG. 1, the bearing 200 may "capture and restrain" the rail 220. As described further below, control current in the control coil 225 changes the amount of flux and therefore force on each side of the gaps between the source of magnetic flux 204 and the rail 220 such that lateral forces may produced or controlled and contact prevented.

A horizontal positioning system 210 may comprises a controller, processor, or other circuit, and may be configured to horizontally center the bearing 200 with respect to the rail 220. The horizontal positioning system 210 may comprise or be operatively coupled to a sensor 290 and a control coil 225. The control coil 225 may carry an electric current which generates a magnetic flux within the coil 225. Accordingly, the control coil 225 operates as an electromagnet, which converts an electric current into magnetic flux. The generated magnetic flux may bias the magnetic field described above with respect to FIG. 1B, thereby providing a horizontal force to the magnetic bearing structure 200 through differential flux control. Accordingly, the amount of magnetic flux is differentially modulated by adding the bias magnetic flux generated by the control coil 225 to the magnetic flux generated by the source of magnetic flux 104. As can be seen in FIG. 1B, the flux direction in the gap 187 between the rail and the outer shell 102 and the flux direction in the gap 188 between the rail and the inner shell 106 are in opposite directions because of the polarity and orientation of the source of magnetic flux. Accordingly, more than one control coil 225, where the direction of the coil winding for each coil is known or predetermined, may be used in series or parallel to appropriately produce net lateral force in the same direction.

Through control of the current through the control coil 225, the horizontal positioning system 210 may horizontally center the bearing 200 on the rail 220. In one embodiment, the horizontal positioning system 210 preserves a constant total air gap between the source of magnetic flux 204 and the rail 220 by balancing attractive horizontal forces between the source of magnetic flux 204 and the rail 220. In particular, because the magnetic attraction pulls both ends of each shell 202, 206 towards the rail 220, the effectiveness of the control is enhanced. In one embodiment, the horizontal positioning system 210 operates to equalizes the magnetic flux on both sides of the rail 220.

In order to determine the horizontal position, one or more sensors 290 may be used. The sensor 290 may generate sensor data indicative of a distance from the sensor 290 to an object or to a predefined reference point. For example, the sensor 290 may generate sensor data indicative of a horizontal position of the magnetic bearing structure 200 with respect to the rail 220. The sensor 290 may comprise, but is not limited to, an inductive proximity sensor, a capacitive displacement sensor, or a laser rangefinder. In one embodiment, the sensor 290 emits a light or acoustic signal and measures changes in a returned field. In another embodiment, the sensor 290 may also generate sensor data indicative of a rate of change of a distance from the sensor 290 to an object. For example, the sensor 290 may generate sensor data indicative of how fast a magnetic bearing structure 200 is approaching a rail 220. The sensor 290 may comprise a Doppler-based sensor. In one embodiment, the sensor 290 emits a light or acoustic signal and measures a change in the wavelength of a returned signal.

In one embodiment, the current carried by the control coil 225 as provided by the horizontal positioning system 210 is based on the horizontal position as determined by the sensor 290. In one embodiment, the current is amplified based on a linear equation in which the current is linearly proportional to a distance indicated by the sensor 290. In another embodiment, the current is amplified based on an inverse quadratic equation in which the current is proportional to the inverse of a square of a distance indicated by the sensor 290. In another embodiment, the current is proportional, either linearly or non-linearly, to a difference in distances indicated by two sensors on opposite sides of the rail 220. Because the current is based, at least in part, on a measurement from the sensor 290, which is based, at least in part on the current provided, the horizontal positioning system 210 may comprise a servo drive to efficiently perform in this feedback situation. In general, a servo drive receives a command signal from a control system, amplifies the signal, and transmits electric current in order to produce motion proportional to the command signal.

In one embodiment, the control coil 225 is wound around the outer shell 202. In another embodiment, the control coil 225 is wound around the inner shell 206. In another embodiment, multiple control coils may be wound around at least one of the outer shell 202 and inner shell 206. For example, in one embodiment, a first control coil is wound around the outer shell 202 and a second coil is wound around the inner shell 206. The control coil 225 may be physically separated from the outer shell 202, the source of magnetic flux 204, and the inner shell 206 by an electrically insulating material.

FIG. 2B is a functional block diagram of a horizontal positioning system 210 according to one embodiment. The horizontal positioning system 210 receives a signal from the sensor 290 indicating the horizontal position of a bearing 200 with respect to a rail 220. A controller 212 processes the signal from the sensor 290 to determine the appropriate correcting current to provide to the control coil 225. The controller 212 controls (and may be powered by) a power source 216 such as a battery or other source of electric current. The controller 212 controls the power source 216 so as to provide a current to the control coil 225. In one embodiment, the horizontal positioning system 210 comprises a memory 214 for storing an algorithm for determining an appropriate current based on the signal received from the sensor 290.

The controller 212 may be a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. The controller 212 may also be implemented as a combination of computing devices, e.g., a combination of a DSP and a microprocessor, a plurality of microprocessors, one or more microprocessors in conjunction with a DSP core, or any other such configuration.

The controller 212 may be coupled, via one or more buses, to read information from or write information to the memory 214. The controller 214 may additionally, or in the alternative, contain memory, such as processor registers. The memory 214 may include processor cache, including a multi-level hierarchical cache in which different levels have different capacities and access speeds. The memory 214 may also include random access memory (RAM), other volatile storage devices, or non-volatile storage devices.

FIG. 2C is flowchart illustrating a method 270 of providing a current to a control coil. The method 270 may be performed, for example, by the horizontal positioning system 210 of FIG. 2B. The method 270 begins, in block 271, with the reception of sensor data indicative of a horizontal position. In one embodiment, the sensor data is indicative of a distance from a sensor to an object or a predefined reference point. For example, in one embodiment, the sensor data is indicative of a horizontal position of a magnetic bearing with respect to a rail. In one embodiment, the sensor data is indicative of a rate of change of a distance from a sensor to an object. For example, in one embodiment, the sensor data is indicative of how fast a magnetic bearing structure is approaching a rail. In another embodiment, the sensor data comprises data from multiple sensors, each indicative of a distance or a rate of change of a distance.

Next, in block 272, it is determined whether the sensor data is indicative of a distance or speed greater than a predetermined threshold. The determination may be performed, for example, by the controller 212 of FIG. 2B. In one embodiment, the predetermined threshold may be zero. If the distance or speed is less than the predetermined threshold, the method 200 moves to block 273 where the method 200 pauses for a predetermined amount of time. By including blocks 272 and 273, the method 270 does not perform a continuous adjustment which may be energy inefficient or may result in excess jerk.

If it is determined that the sensor data is indicative of a distance or speed greater than the predetermined threshold, the method 200 continues to block 274, where a current corresponding to the received sensor data is determined. The determination may be performed, for example, by the controller 212 of FIG. 2B. In one embodiment, the current is amplified based on a linear equation in which the current is linearly proportional to a distance indicated by the sensor. In another embodiment, the current is amplified based on an inverse quadratic equation in which the current is proportional to the inverse of a square of a distance indicated by the sensor. In another embodiment, the current is proportional, either linearly or non-linearly, to a difference in distances indicated by two sensors on opposite sides of a rail. In yet another embodiment, the current is amplified based on a look-up table. Such a look-up table may be stored, for example, in the memory 214 of FIG. 2B. In one embodiment, the current is determined proportional to a speed indicated by the sensor. In another embodiment, the current is determined based on a distance and a speed indicated by the sensor.

Continuing to block 275, the determined current is provided to one or more control coils. The current may be provided, for example, by the power source 216 as controlled by the controller 212 of FIG. 2B. The current provided to the control coils may generate a magnetic flux within the control coil and thereby bias the magnetic field described above with respect to FIG. 1B so as to provide a horizontal force and horizontally center the bearing on the rail. It is to be appreciated that in some embodiments, the determined current may be zero. For example, the determined current may be zero when a magnetic bearing is centered with respect to a rail in the absence of external forces.

After block 275, the method 270 returns to block 271 and repeats. Thus, the method 270 continually provides a current based on sensor data. In one embodiment, the horizontal positioning system 210 continually centers a magnetic bearing with respect to a rail.

FIG. 3 is a cross-sectional view of a system 30 comprising a vehicle 330 having a load 360 coupled to magnetic bearing structures 310, 312 positioned proximally to rails 320, 322. By using two rails rather than a single rail, rotation of the vehicle with respect to the rail may be inhibited. The vehicle comprises a first bearing 310 positioned proximally to the first rail 320 and a second bearing 312 positioned proximally to the second rail 322. The bearings 310, 312 provide a suspensive or levitative force counteracting the force of gravity acting upon the vehicle 330 and the load 360, thereby reducing friction along the rails. The bearings 310, 312 are attached to the load 360 via one or more support structures 362. The bearings may be attached via welding, screws, or other affixing techniques.

A horizontal position system (not shown) comprising one or more position sensors and one or more control coils may keep the bearings horizontally centered such that the bearings do not contact the rails, further reducing friction. In one embodiment, the horizontal positioning system comprises one or more control coils configured to respectively carry one or more electrical currents so as to provide a horizontal force as described above with respect to FIG. 2.

In one embodiment, the system may use asymmetrical air gaps as described in U.S. patent application Ser. No. 12/048,062, herein incorporated by reference in its entirety. In one embodiment, the inner gaps 380 between the bearings 310, 312 and the rails 320, 322 are of a different size than the outer gaps 382 between the bearings 310, 312 and the rails 320, 322. Thus, if the vehicle 330 is displaced horizontally, only one of the bearings would contact the rails.

Whereas the system 30 may comprise bearings which provide a force in the vertical direction and a horizontal positioning system which provides a horizontal force, the system 30 may also comprise an engine which provides a propulsive force in the direction of the rails 320, 322. Accordingly, the system 30 may be provided six degrees of freedom. In one embodiment, the engine comprises a conventional, wheeled locomotive engine connected to the vehicle 330. In another embodiment, the engine comprises a linear motor as described in U.S. patent application Ser. No. 12/048,062 or U.S. Pat. No. 7,617,779, herein incorporated by reference in its entirety.

Although only two bearings 310, 312 are shown in FIG. 3, it is to be appreciated that a vehicle or system could contain additional independent bearings in various configurations. For example, bearings may be approximately positioned at four corners of a vehicle. As another example, bearings having an approximate axial length similar to that of the vehicle may be positioned on each side of the vehicle. In one embodiment, multiple vehicles having bearings may be pulled or pushed by one or more wheeled or levitating engines.

Some of the benefits of levitating platforms, such as the vehicle 330 of FIG. 3, as opposed to wheeled carts are, among other things, the reduction of wear on mechanical parts, the reduction of extraneous heat produced, and the reduction of noise. A hybrid levitation system has the potential to be more energy efficient than conventional systems by virtue of the reduced friction. One embodiment of the invention comprises a MagLev system comprising one or more magnetic bearings.

Figure 4:
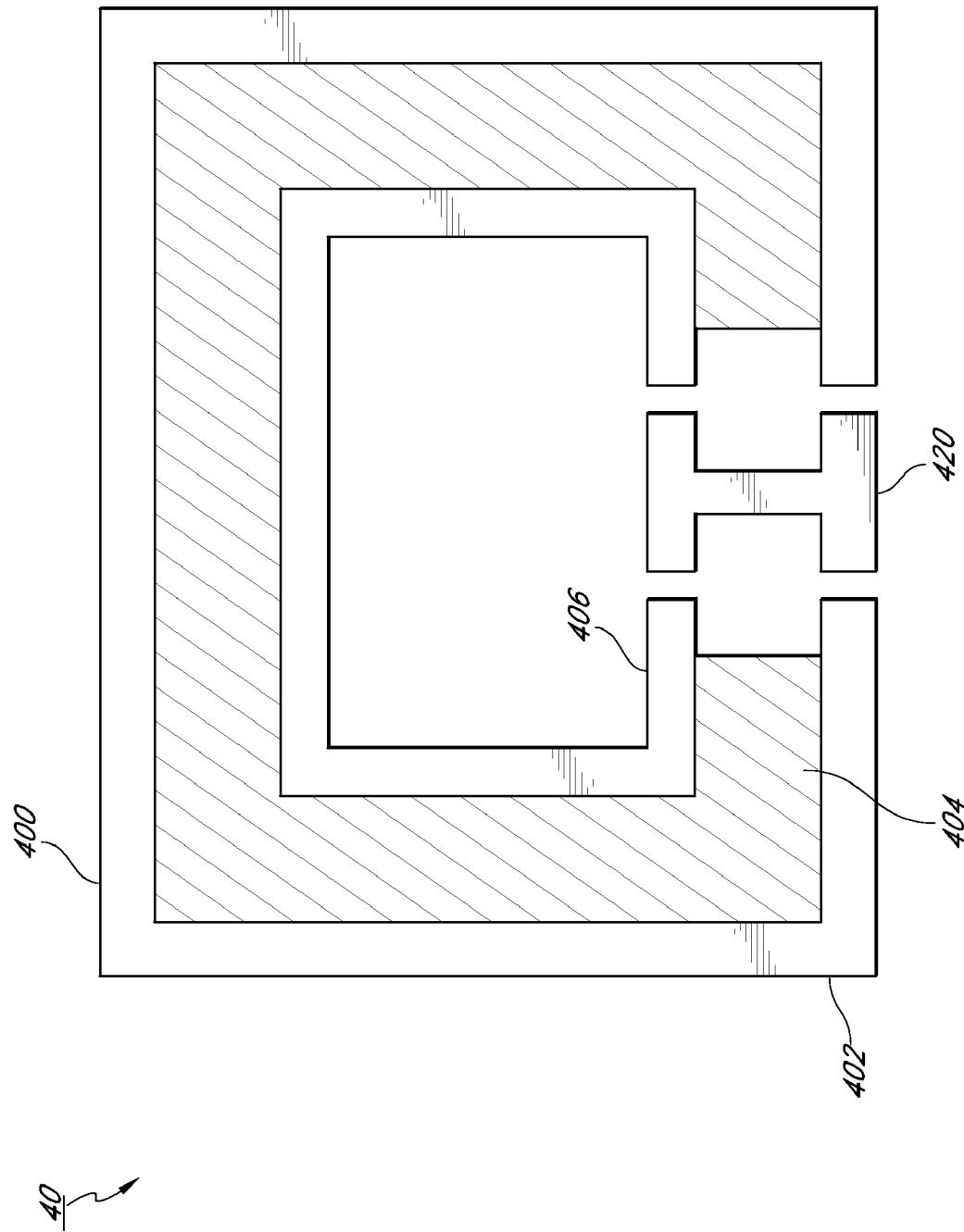
FIG. 4 is a cross-sectional view of a system comprising a prismatic magnetic bearing structure.

FIG. 4 is a cross-sectional view of a system 40 comprising a prismatic magnetic bearing structure 400. The system 40 differs from the embodiments described above in that the magnetic bearing structure 400 is not tubular, but rather shaped as a prism. Although a rectangular prism is shown in FIG. 4, other shapes may be used. For example, in one embodiment, the cross-section of the magnetic bearing structure 400 is triangular. Otherwise, the structure and functionality of the system 40 may be as the system 20 of FIG. 2 as described above. Because the magnetic bearing structure 400 is prismatic, the bearing 400 may be more easily attached to a vehicle or more easily stored. Because a prismatic structure generally contains flat surfaces, manufacture of a source of magnetic flux may be simplified and control coils may be more easily installed.

Figure 5:
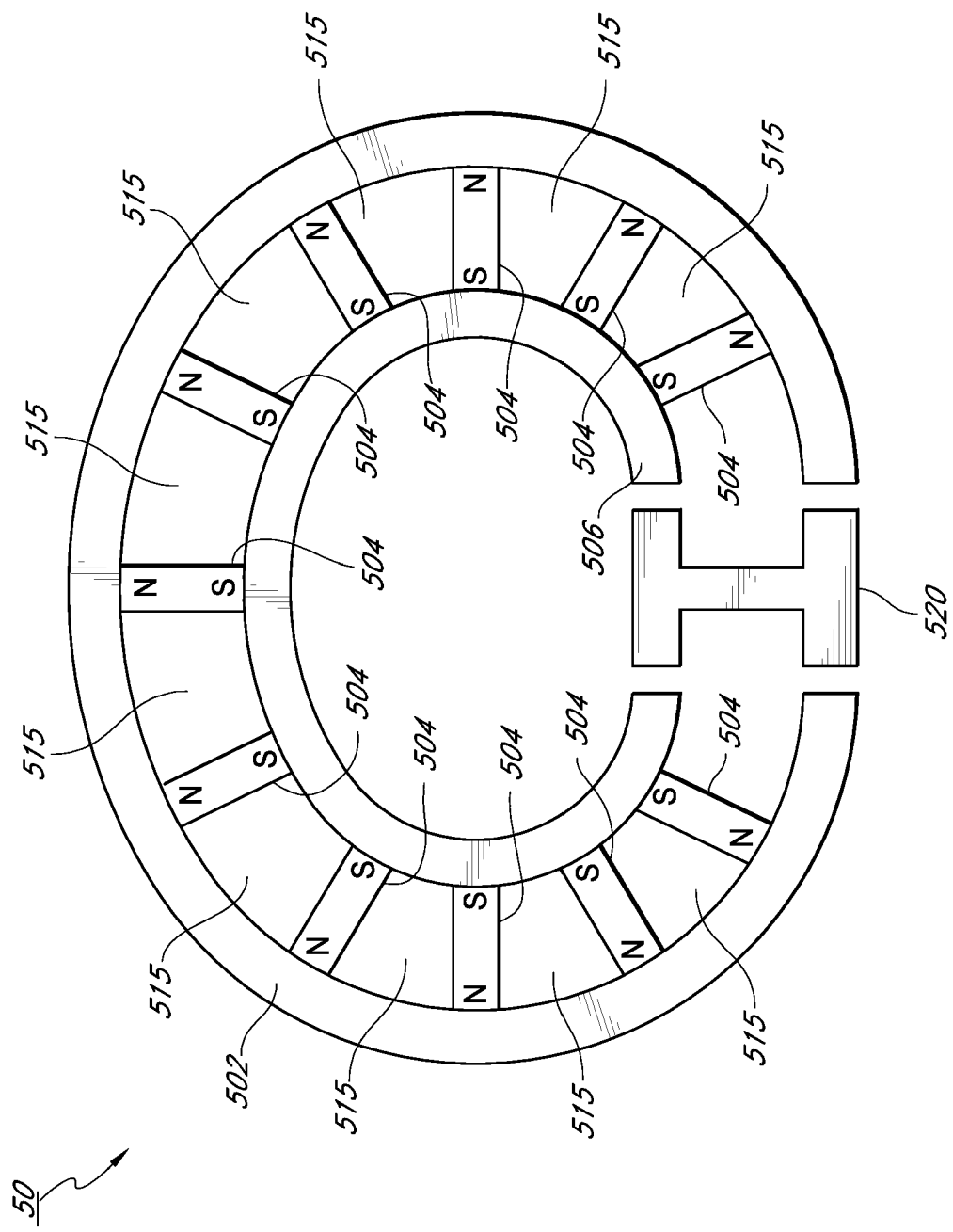
FIG. 5 is a cross-sectional view of a system comprising a magnetic bearing structure with a plurality of magnets.

FIG. 5 is a cross-sectional view of another system 50 comprising a magnetic bearing structure 500. The system 50 differs from the embodiments described above in that the source of magnetic flux 504 comprises a plurality of magnets 504 arranged such that one polarity faces the outer shell 502 and the other polarity faces the inner shell 506. Between the magnets 504, there is a non-magnetizable substance 515, such as glass, wood, resin, or air and offering more space and potentially suitable locations for placement of control windings. Otherwise, the structure and functionality of the system 50 may be as the system 20 of FIG. 2 as described above. Because the magnetic bearing structure 500 comprises a plurality of magnets 504 rather than a single magnet, the source of magnetic flux 504 may be less expensive. However, if the plurality of magnets 504 are too spaced apart, magnetic field lines may exist through the non-magnetizable material rather than through the rail 520 thereby decreasing the levitative force.

FIG. 6 is a cross-sectional view of a system comprising a magnetic bearing structure with two magnets The magnetic bearing structure 600 comprises a support structure 630 and a source of magnetic flux comprising two magnets 604a, 604b arranged on either side of the rail 620. The magnets 604a, 604b are arranged such that the top of each magnet 604a, 604b is of one polarity and the bottom of each magnet 604a, 604b is of the other polarity. In one embodiment, the support structure 360 fixes the location of the magnets 604a, 604b with respect to each other. Otherwise, the structure and functionality of the system 60 may be as the system 20 of FIG. 2 as described above. Because the magnetic bearing structure 600 has only two magnets, production may be simplified or costs may be reduced. However, magnetic field lines may exist to the left of the left magnet 604a or to the right of the right magnet 604b rather than through the rail 620 thereby decreasing the levitative force.

In one embodiment, the source of magnetic flux positioned proximally to the rail may be narrow in the vertical direction or may comprise narrow protrusions towards the rail so as to provide resistance to vertical displacement by reluctance changes.

While the above description has pointed out novel features of the invention as applied to various embodiments, the skilled person will understand that various omissions, substitutions, and changes in the form and details of the device or process illustrated may be made without departing from the scope of the invention.

What is claimed is:

1. An apparatus for carrying a load, the apparatus comprising:
a source of magnetic flux comprising:
a first upper portion and a first lower portion of opposite polarities, wherein the first portions are spaced apart horizontally from a first side of a magnetizable structure; and
a second upper portion and a second lower portion of opposite polarities, wherein the second portions are spaced apart horizontally from a second side of the magnetizable structure, wherein the second side is opposite the first side, and wherein the first and second upper portions are magnetically attracted to an upper portion of the magnetizable structure and the first and second lower portions are magnetically attracted to a lower portion of the magnetizable structure;
an inner flux guide attached to an inner surface of the source of magnetic flux;
an outer flux guide attached to an outer surface of the source of magnetic flux, wherein the inner and outer flux guides comprise a magnetizable material; and
a controller configured to control the position of the source of magnetic flux relative to the magnetizable structure.

2. The apparatus of claim 1, wherein the source of magnetic flux comprises at least one of the following: one or more permanent magnets, a plurality of sources of magnetic flux separated by non-magnetizable spacers, a bonded magnet, and a uniformly radially magnetized magnet.

3. The apparatus of claim 1, wherein each of the flux guides is configured to concentrate magnetic flux generated by the source of magnetic flux.

4. The apparatus of claim 1, wherein the controller comprises a control coil configured to carry an electric current to bias the magnetic flux generated by the source of magnetic flux.

5. The apparatus of claim 1, wherein the controller further comprises:
one or more sensors configured to generate sensor data indicative of a horizontal position of at least one of the portions of the source of magnetic flux; and
a circuit configured to provide a current based on the sensor data.

6. The apparatus of claim 5, wherein at least one of the sensors is configured to determine a gap distance between the source of magnetic flux and the magnetizable structure.

7. The apparatus of claim 5, wherein the current is configured to equalize magnetic flux on both sides of the magnetizable structure.

8. The apparatus of claim 5, wherein the current generates a bias magnetic flux to increase or decrease the magnetic flux generated by the source of magnetic flux.

9. The apparatus of claim 1, further comprising an engine configured to provide a propulsive force along the magnetizable structure.

10. The apparatus of claim 1, further comprising an additional source of magnetic flux comprising:
an additional first upper portion and an additional first lower portion of opposite polarities, wherein the additional first portions are spaced apart horizontally from an additional magnetizable structure on a first side of the additional magnetizable structure; and
an additional second upper portion and an additional second lower portion of opposite polarities, wherein the additional second portions are spaced apart horizontally from the additional magnetizable structure on a second side of the additional magnetizable structure, wherein the second side is opposite the first side, wherein the upper portions are magnetically attracted to an upper portion of the additional magnetizable structure and the lower portions are magnetically attracted to a lower portion of the additional magnetizable structure, wherein the magnetizable structure and the additional magnetizable structure are spaced apart horizontally.

11. The apparatus of claim 10, further comprising a load coupled to the sources of magnetic flux such that the sources restrain rotation of the load about the magnetizable structure.

12. The apparatus of claim 1, wherein the source of magnetic flux comprises a plurality of protrusions towards the magnetizable structure configured to provide resistance to vertical displacement of the source of magnetic flux.

13. The apparatus of claim 1, further comprising one or more flanged wheels configured to guide a load along the magnetizable structure.

14. The apparatus of claim 1, wherein the first upper portion is configured to inject magnetic flux into the upper portion of the magnetizable structure on the first side, wherein the second upper portion is configured to inject magnetic flux into the upper portion of the magnetizable structure on the second side, wherein the magnetic flux is conducted vertically in the magnetizable structure to the lower portion, wherein at least a portion of the magnetic flux is to returned to the first lower portion via the lower portion of the magnetizable structure on the first side, and wherein at least a portion of the magnetic flux is returned to the second lower portion via the lower portion of the magnetizable structure on the second side.

15. A system for carrying a load, the system comprising:
means for generating magnetic flux comprising:
first upper means for generating magnetic flux;
first lower means for generating magnetic flux, wherein the first upper means and first lower means are spaced apart horizontally from a first side of a magnetizable structure, wherein the first upper means and first lower means are of opposite polarities;
second upper means for generating magnetic flux; and
second lower means for generating magnetic flux, wherein the second upper means and second lower means are spaced apart horizontally from a second side of the magnetizable structure, wherein the second upper means and second lower means are of opposite polarities, wherein the second side is opposite the first side, and wherein the first and second upper means are magnetically attracted to an upper portion of the magnetizable structure and the first and second lower means are magnetically attracted to a lower portion of the magnetizable structure;
first means for guiding the magnetic flux, the first flux guiding means attached to an inner surface of the means for generating magnetic flux;
second means for guiding the magnetic flux, the second flux guiding means attached to an outer surface of the means for generating magnetic flux; and
means for controlling the position of the means for generating magnetic flux relative to the magnetizable structure.

16. The system of claim 15, wherein the means for generating magnetic flux comprise at least one of the following: one or more permanent magnets, a plurality of sources of magnetic flux separated by non-magnetizable spacers, a bonded magnet, and a uniformly radially magnetized magnet.

17. The system of claim 15, wherein the means for controlling the position comprises a controller circuit.

18. The system of claim 15, wherein the means for controlling the position comprises means for generating an electric current to bias the magnetic flux generated by the source of magnetic flux.

19. The system of claim 15, wherein the means for controlling the position comprising means for sensing the horizontal position of at least one of the portions of the source of magnetic flux and means for providing a current based on the sensing.

20. The system of claim 19, wherein the means for sensing the horizontal position comprises means for determining a gap distance between the source of magnetic flux and the magnetizable structure.

21. The system of claim 15, wherein the means for controlling the position comprises means for equalizing the magnetic flux on both sides of the magnetizable structure.

* * * * *